C. E. ACKER.

ELECTROLYTIC PROCESS OF PRODUCING NITROGEN COMPOUNDS.

APPLICATION FILED SEPT. 14, 1911.

Reissued Dec. 26, 1911.

13,343.

2 SHEETS—SHEET 1.

Witnesses:
C. L. Belcher
Chas. P. Sidden

Inventor
Charles E. Acker
By his Attorneys
Rosenbaum & Sparkman

C. E. ACKER.

ELECTROLYTIC PROCESS OF PRODUCING NITROGEN COMPOUNDS.

APPLICATION FILED SEPT. 14, 1911.

Reissued Dec. 26, 1911.

13,343.

2 SHEETS—SHEET 2.

Witnesses:
C. L. Belcher
Chas. T. Hidden

Inventor
Charles E. Acker
By his Attorneys
Rosenbaum & Sinsheimer

UNITED STATES PATENT OFFICE.

CHARLES E. ACKER, OF OSSINING, NEW YORK, ASSIGNOR TO THE NITROGEN COMPANY, A CORPORATION OF NEW YORK.

ELECTROLYTIC PROCESS OF PRODUCING NITROGEN COMPOUNDS.

13,343. Specification of Reissued Letters Patent. Reissued Dec. 26, 1911.

Original No. 914,214, dated March 2, 1909, Serial No. 337,976. Application for reissue filed September 14, 1911. Serial No. 649,398.

*To all whom it may concern:*

Be it known that I, CHARLES E. ACKER, a citizen of the United States, residing at Ossining, in the county of Westchester and State of New York, have invented certain new and useful Improvements in Electrolytic Processes of Producing Nitrogen Compounds, of which the following is a full and clear specification.

This process relates to the electrolytic production of nitrogen compounds, such as nitrids, amids, cyanamids and cyanids, especially those of the alkali and alkaline-earth metals.

The process comprises the steps of electrolyzing a molten compound of the metal or base which is to be combined with nitrogen, alloying the separated metal with a cathode metal, reacting on the alloyed metal with a nitrogenous gas, and returning the residual metal to the cathode. Incidental steps are the injection of the nitrogenous gas in a direction to cause or assist the circulation of the alloy and residual metal; cooling the alloy before treatment with the gas, especially by maintaining opposed adjacent streams of the alloy and residual metal; and successively reacting on the alloyed metal and on the initial product of reaction in the presence of the residual metal.

Figure 1:
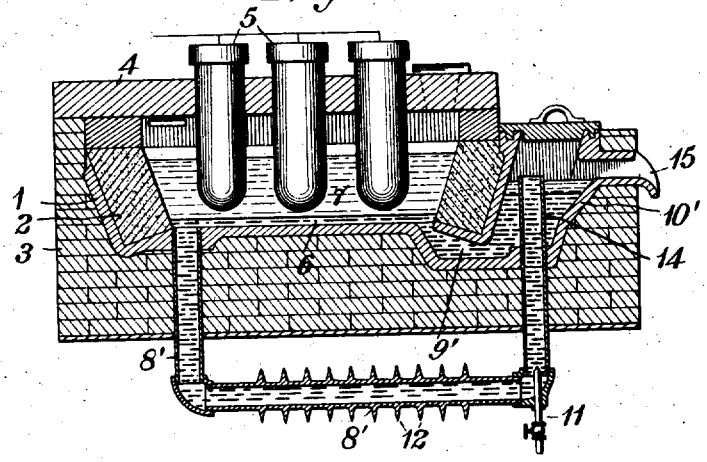
Figure 2:
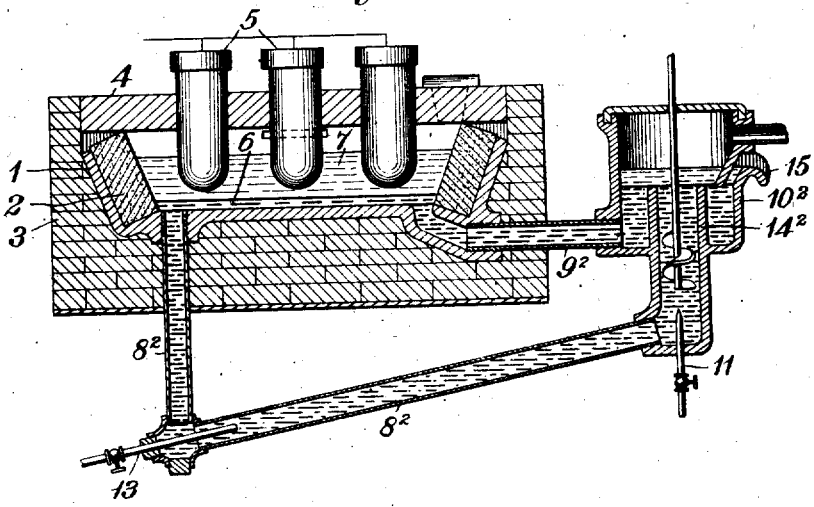
Figure 3:
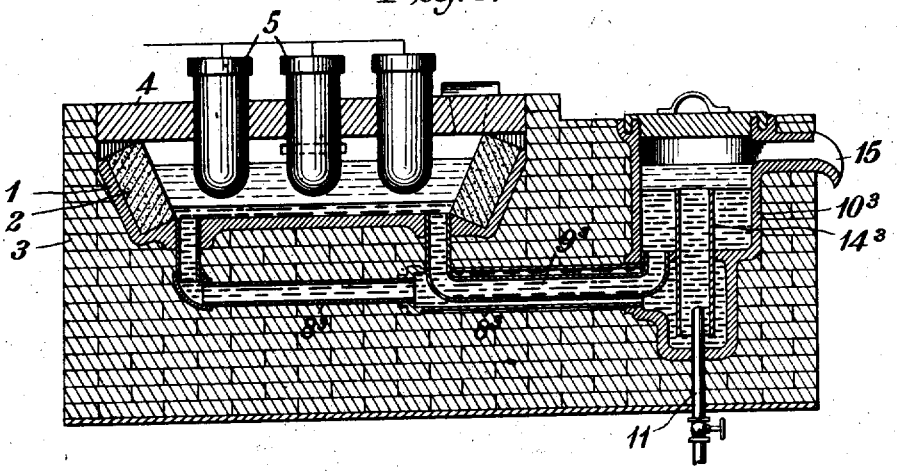
Figure 4:
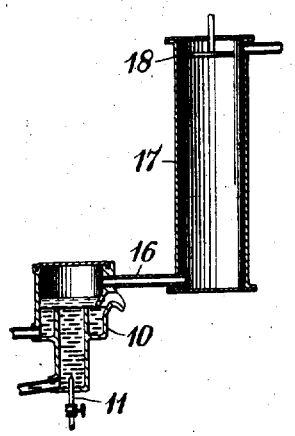

Apparatus which may be used in carrying out the process is shown in the accompanying drawings, in which:

Figures 1, 2, 3 are vertical longitudinal sections of three different constructions, each comprising an electrolytic cell and a separate connected chamber for treating the alloy; and Fig. 4 illustrates an auxiliary gas-absorbing tower.

Each apparatus illustrated has the general construction of that heretofore devised by me for the production of caustic alkali, the electrolytic cell comprising a cast iron vessel 1 lined at the sides with magnesia brick 2, inclosed in brickwork 3 and covered by a refractory slab 4, through which pass the depending carbon anodes 5. In the bottom of the vessel is a shallow layer 6 of a molten heavy inert metal such as lead, constituting the cathode, upon which is the molten electrolyte 7. The vessel 1 is connected by delivery and return pipes or ducts 8, 9 to a separate chamber 10, into which the nitrogenous gas may be introduced by a valved pipe 11. The chamber 10 may be inclosed in the brickwork 3, as shown in Figs. 1, 3, or may be outside it as shown in Fig. 2, depending on the temperature which it is desired to maintain therein.

The delivery pipe $8'$ of the apparatus shown in Fig. 1 is provided with a series of annular heat-radiating flanges 12, to cool the alloy therein. The delivery pipe $8^2$ of the apparatus shown in Fig. 2 has a lower portion which receives a supplemental gas inlet pipe 13 and thence inclines upward to the chamber 10, the gas injected through the pipe 13 and the initial light compounds produced by the gas rising and moving along the pipe, facilitating the reaction therein. In the apparatus of Fig. 3, a portion of the delivery pipe $8^3$ is enlarged and receives the return pipe $9^3$, so that heat maybe transferred from the outflowing alloy to the returning residual metal. The circulation of the alloy and metal may be effected either solely by the current of injected gas, as in the apparatus of Figs. 1, 3, or by a mechanical device, for example the screw shown in Fig. 2, or by both.

The reaction chamber 10 is of the general construction of that employed in my caustic alkali apparatus comprising a vertical central pipe 14, which receives the molten alloy and injected gas. The nitrogen compound resulting from the reaction, being usually lighter than the residual metal, rises and collects as a floating layer, which may be run out through a suitable outlet 15 the metal returning to the electrolytic cell to reconstitute the cathode.

Specific processes which may be carried out are the production of sodium amid by the injection of ammonia into the molten sodium-lead alloy resulting from the electrolysis of a sodium compound, such as the chlorid upon a lead cathode; or the production of calcium nitrid by the injection of nitrogen into an electrolytic calcium-lead alloy. If desired, the alloy may be cooled, wholly or partially, by injecting a regulated amount of a cooled and compressed gaseous reagent, or of a volatile liquid, for example ammonia. The gaseous reagent may be diluted with an inert gas, or mixed with a hydrocarbon gas to produce carbon compounds. Solid carbon or other reagent may be introduced into the reaction chamber 10. Alkali-metal cyanids or cyanamids may be produced in this chamber by first producing sodium amid at a relatively low temperature and then reacting on the amid with carbon or a carbonaceous reagent at a higher temperature, in the presence of the residual metal. For this purpose it is desirable to first cool the alloy, to prevent decomposition of the injected ammonia by heat, or to employ the expansion of the ammonia to effect this local cooling, and to then retain the heat of reaction and supply heat by conduction from the electrolytic cell, employing apparatus of the type shown in Figs. 1 and 3, in which the chamber 10 and cell are inclosed in the same brickwork. In the production of amids, some of the injected ammonia is apt to pass off without reacting on the sodium in the alloy. This portion of the gas may be recovered by delivering it from the chamber 10 through a pipe 16 into the base of a tower 17, into the top of which water is sprayed through a rose 18. The gas is then recovered from the aqueous solution by distillation and returned to the reaction chamber.

I claim:

1. The electrolytic process of producing nitrogen compounds, which consists in continuously electrolyzing a molten compound of a metal capable of forming nitrogen compounds, alloying the separated metal with a cathode metal, removing the alloy and reacting on the constituent metal of said alloy which is capable of forming nitrogen compounds with a nitrogenous reagent, separating the products of reaction, and returning the residual metal to the cathode.

2. The electrolytic process of producing nitrogen compounds, which consists in continuously electrolyzing a molten compound of a metal capable of forming nitrogen compounds, alloying the separated metal with a molten cathode metal, removing the molten alloy and reacting on the constituent metal of said alloy which is capable of forming nitrogen compounds with a nitrogenous gas, separating the products of reaction, and returning the residual metal to the cathode.

3. The electrolytic process of producing nitrogen compounds, which consists in continuously electrolyzing a molten compound of a metal capable of forming nitrogen compounds, alloying the separated metal with a molten cathode metal, removing and cooling the molten alloy and reacting on the constituent metal of said alloy which is capable of forming nitrogen compounds with a nitrogenous gas, separating the products of reaction, and returning the residual metal to the cathode.

4. The electrolytic process of producing nitrogen compounds, which consists in continuously electrolyzing a molten compound of a metal capable of forming nitrogen compounds, alloying the separated metal with a molten cathode metal, removing the molten alloy and reacting on the constituent metal of said alloy which is capable of forming nitrogen compounds with a nitrogenous gas, separating the products of reaction, transferring heat from another portion of the molten alloy to the residual metal, and returning the heated metal to the cathode.

5. The electrolytic process of producing nitrogen compounds, which consists in continuously electrolyzing a molten compound of a metal capable of forming nitrogen compounds, alloying the separated metal with a molten cathode metal, removing the molten alloy and injecting into it a compressed nitrogenous gas, thereby cooling the alloy and producing a compound, separating the products of reaction, and returning the residual metal to the cathode.

6. The electrolytic process of producing nitrogen compounds, which consists in continuously electrolyzing a molten compound of a metal capable of forming nitrogen compounds, alloying the separated metal with a molten cathode metal, removing the molten alloy and injecting into it a compressed and cooled nitrogenous gas, thereby cooling the alloy and producing a compound, separating the products of reaction, and returning the residual metal to the cathode.

7. The electrolytic process of producing nitrogen compounds, which consists in continuously electrolyzing a molten compound of a metal capable of forming nitrogen compounds, alloying the separated metal with a molten cathode metal, removing the molten alloy, converting the constituent metal of said alloy which is capable of forming nitrogen compounds into a nitrogen compound, and returning the residual metal to the cathode, and producing the nitrogen compound by injecting a nitrogenous gas into the moving alloy.

8. The electrolytic process of producing nitrogen compounds, which consists in continuously electrolyzing a molten compound of a metal capable of forming nitrogen compounds, alloying the separated metal with a molten cathode metal, removing the molten alloy, converting the constituent metal of said alloy which is capable of forming nitrogen compounds into a nitrogen compound, and returning the residual metal to the cathode, and producing the nitrogen compound by injecting a nitrogenous gas into the moving alloy in a direction to assist the circulation.

9. The electrolytic process of producing alkali-metal amids, which consists in continuously electrolyzing a molten compound of the alkali metal, alloying the separated alkali metal with a cathode metal, removing the alloy and reacting on the alloyed alkali metal with a nitrogenous reagent to form an amid, separating the resulting amid, and returning the residual metal to the cathode.

10. The electrolytic process of producing alkali-metal amids, which consists in continuously electrolyzing a molten compound of the alkali metal, alloying the separated alkali metal with a cathode metal, removing the alloy and reacting on the alloyed alkali metal with ammonia to form an amid, separating the resulting amid, and returning the residual metal to the cathode.

11. The electrolytic process of producing alkali-metal amids, which consists in continuously electrolyzing a molten compound of the alkali metal, alloying the separated alkali metal with a cathode metal, removing and cooling the alloy and reacting on the alkali metal constituent of said alloy with ammonia to form an amid, separating the resulting amid, and returning the residual metal to the cathode.

12. The electrolytic process of producing alkali-metal amids, which consists in continuously electrolyzing a molten compound of the alkali metal, alloying the separated alkali metal with a cathode metal, removing the alloy and reacting on the alkali metal constituent of said alloy with ammonia to form an amid, separating the resulting amid, returning the residual metal to the cathode, and recovering and utilizing the unabsorbed ammonia.

13. The electrolytic process which consists in continuously electrolyzing a molten compound with a molten metal cathode, removing and cooling the molten cathode product and reacting on a constituent thereof with a suitable agent, and returning the residual molten metal to the cathode.

14. The electrolytic process which consists in continuously electrolyzing a molten compound with a molten metal cathode, removing and cooling the molten cathode product and reacting on a constituent thereof with a suitable agent, returning the residual molten metal to the cathode, and maintaining adjacent but oppositely-directed streams of the cathode product and residual metal to permit the exchange of heat between the streams.

15. A process of making alkali amid, consisting in electrolyzing a molten alkali compound in one vessel in the presence of a molten metal whereby the alkali metal in the compound combines with the molten metal, passing the molten alloy into another vessel in free communication with the former and subjecting said molten alloy to the action of ammonia.

16. A process of making sodium amid, consisting in electrolyzing molten sodium chlorid in one vessel in the presence of a molten metal whereby the sodium combines with the metal, passing the molten alloy into another vessel in free communication with the former and subjecting said molten alloy to the action of ammonia.

17. A process of making sodium amid, consisting in electrolyzing molten sodium chlorid in one vessel in the presence of molten lead whereby the sodium combines with the lead, passing the molten alloy into another vessel in free communication with the former and subjecting said molten alloy to the action of ammonia.

18. The process of producing alkali-metal amids, which consists in electrolyzing a molten alkali-metal compound in one vessel in the presence of a molten alloying metal, passing the molten alloy into another vessel in free communication with the first vessel and cooling the alloy, and reacting on the alkali metal constituent of the cooled alloy with a nitrogenous reagent.

19. The process of making sodium amid, which consists in electrolyzing molten sodium chlorid in one vessel in the presence of a molten alloying metal, passing the molten sodium alloy into another vessel in free communication with the first vessel and cooling the alloy, and reacting on the alkali metal constituent of the cooled alloy with a nitrogenous reagent.

20. The process of making sodium amid, which consists in electrolyzing molten sodium chlorid in the vessel in the presence of molten lead, passing the molten sodium-lead alloy into another vessel in free communication with the first vessel and cooling the alloy and reacting on the alkali metal constituent of the cooled alloy with ammonia.

21. The process of producing alkali-metal amids, which consists in electrolyzing a molten alkali-metal compound in one vessel in the presence of a molten alloying metal, passing the molten alloy into another vessel in free communication with the first vessel, and reacting on a constituent of the alloy with a nitrogenous reagent.

22. The process of producing alkali-metal amids, which consists in electrolyzing an alkali-metal compound in one vessel in the presence of a suitable liquid metal with which the freed alkali-metal will mix, passing the mixture into another vessel in free communication with the first vessel, and reacting on a constituent of the mixture with a nitrogenous reagent.

23. The electrolytic process of producing alkali-metal amids, which consists in electrolyzing a molten compound of the alkali metal, alloying the separated alkali metal with a cathode metal, removing the alloy and reacting on the alloyed alkali metal with a nitrogenous reagent, separating the resulting amid, and returning the residual metal to the cathode.

24. The electrolytic process of producing alkali-metal amids, which consists in electrolyzing a molten compound of the alkali metal, alloying the separated alkali metal with a cathode metal, removing the alloy and reacting on the alloyed alkali metal with ammonia, separating the resulting amid, and returning the residual metal to the cathode.

25. The electrolytic process of producing alkali-metal amids, which consists in electrolyzing a molten compound of the alkali metal, alloying the separated alkali metal with a cathode metal, removing the alloy and reacting on the molten alloyed alkali metal with a nitrogenous reagent, separating the resulting amid, and returning the residual metal to the cathode.

26. The electrolytic process of producing alkali-metal amids, which consists in electrolyzing a molten compound of the alkali metal, alloying the separated alkali metal with a cathode metal, removing the alloy and reacting on the molten alloyed alkali metal with ammonia, separating the resulting amid, and returning the residual metal to the cathode.

27. The electrolytic process of producing alkali-metal amids, which consists in electrolyzing a molten compound of the alkali metal, alloying the separated alkali metal with a cathode metal, removing the alloy and reacting on the molten alloyed alkali metal with a nitrogenous reagent, separating the resulting amid, and returning the molten residual metal to the cathode.

28. The electrolytic process of producing alkali-metal amids, which consists in electrolyzing a molten compound of the alkali metal, alloying the separated alkali metal with a cathode metal, removing the alloy and reacting on the molten alloyed alkali metal with ammonia, separating the resulting amid, and returning the molten residual metal to the cathode.

29. The process of producing nitrogen compounds, which comprises electrolyzing a molten compound of a metal capable of forming a nitrogen compound, alloying the separated metal with a cathode metal, removing the alloyed cathode metal and metal capable of forming a nitrogen compound, and treating the last mentioned metal to separate at least a part of the same from the alloy and convert such part into a nitrogen compound, said treatment including effecting a reaction in which the metal capable of forming a nitrogen compound and nitrogen take part.

30. The process of producing nitrogen compounds, which comprises electrolyzing a molten compound of a metal capable of forming a nitrogen compound, alloying the separated metal with a cathode metal, removing the alloyed cathode metal and metal capable of forming a nitrogen compound, and treating the last mentioned metal to separate at least a part of the same from the alloy and convert such part into a nitrogen compound, said treatment including effecting a reaction in which the metal capable of forming a nitrogen compound and nitrogen take part, separating the products of reaction, and returning the residual metal to the cathode.

31. The process of producing nitrogen compounds which comprises electrolyzing a molten compound of a metal capable of forming a nitrogen compound, alloying the separated metal with a cathode metal, removing the alloyed cathode metal and metal capable of forming a nitrogen compound, and treating the last mentioned metal to separate at least a part of the same from the alloy and convert such part into a nitrogen compound, said treatment including effecting a reaction in which the metal capable of forming a nitrogen compound, nitrogen, and an element capable of entering into combination with the two last mentioned substances, take part.

32. The process of producing nitrogen compounds, which comprises electrolyzing a molten compound of a metal capable of forming a nitrogen compound, alloying the separated metal with a cathode metal, removing the alloyed cathode metal and metal capable of forming a nitrogen compound, and treating the last mentioned metal to separate at least a part of the same from the alloy and convert such part into a nitrogen compound, said treatment including effecting a reaction in which the metal capable of forming a nitrogen compound, nitrogen, and an element capable of uniting with nitrogen to form a radical, take part.

33. The process of producing nitrogen compounds which comprises electrolyzing a molten compound of a metal capable of forming nitrogen compounds, alloying the separated metal with the cathode metal, removing the alloyed cathode metal and nitrogen-compound forming metal, reacting on the nitrogen-compound forming metal with a gaseous nitrogenous reagent, separating the products of reaction, and returning the residual metal to the cathode.

34. The electrolytic process of producing nitrogen compounds which comprises electrolyzing a molten compound of a metal capable of forming a nitrogen compound, alloying the separated metal with a cathode metal, treating the alloy to separate therefrom at least a part of the metal therein which is capable of forming a nitrogen compound and to form a nitrogen compound of such part, such treatment including effecting a reaction between the nitrogen-compound forming metal and a nitrogenous reagent at least a portion of which is capable of entering into combination with said nitrogen-compound forming metal to form a nitrogen compound of a different specific gravity to that of said alloy.

35. The electrolytic process of producing nitrogen compounds which comprises electrolyzing a molten compound of a metal capable of forming a nitrogen compound, alloying the separated metal with a cathode metal, removing the alloy and treating it to separate therefrom at least a part of the metal therein which is capable of forming a nitrogen compound and to form a nitrogen compound of such part, such treatment including effecting a reaction between the nitrogen-compound forming metal and a nitrogenous reagent at least a portion of which is capable of entering into combination with said nitrogen-compound forming metal to form a nitrogen compound of a different specific gravity to that of said alloy, and returning the residual metal to the cathode.

36. The electrolytic process of producing nitrogen compounds which comprises electrolytically depositing metallic matter from a body of material in a vessel, supplying the so deposited metallic matter to a vessel in fluid communication with that first mentioned, and reacting upon said metallic matter in said second vessel with gaseous nitrogenous matter.

37. The electrolytic process of producing nitrogen compounds of the alkali metals which comprises constituting one compartment of a receptacle having two adjoining compartments, a supply chamber for alkaline metallic matter, by decomposing an alkali-metal haloid in said compartment, supplying alkaline metallic matter to the other of said compartments, and reacting on said alkaline metallic matter in said second compartment with nitrogenous matter, which is substantially free from water or water forming constituents.

38. The electrolytic process of producing a nitrogen compound which comprises combining a metallic element with nitrogenous matter by reacting with a gaseous nitrogenous reagent which is substantially free from oxygen on a body of heated material containing said element, supplying said metallic element for such reaction by electrolytically depositing said metallic element from a body of electrolyte, and combining the so deposited element with parts of said body of heated material which have been deprived, at least in part, of their content of said element.

39. The process of producing a nitrogen compound which comprises electrolytically liberating a metallic element capable of forming nitrogen compounds in a chamber, conveying said liberated element in fluid condition to a second chamber, and effecting a reaction in which the said metallic element and nitrogen participate, while maintaining the mass of so reacting matter substantially free from oxygen.

40. The process of producing a nitrogen compound which comprises electrolytically liberating a metallic element, capable of forming nitrogen compounds, in a chamber containing molten cathode metal, conveying said liberated element, while alloyed with said cathode metal, to a second chamber, and effecting a reaction in which the said metallic element and nitrogen participate, while maintaining the mass of so reacting matter substantially free from oxygen.

41. The process of abstracting alkali metal from a salt of the same which comprises electrolyzing a molten body of said salt in a vessel, and electrolytically depositing the alkali metal into a body of molten cathode metal which is normally solid, conveying the alloy so formed to a second vessel, and there treating said alloy to remove a portion at least of its alkali metal content, said treatment including combining said metal with a radical containing nitrogen.

42. The process of abstracting alkali metal from a salt of the same which comprises electrolyzing a molten body of said salt in a vessel and electrolytically depositing the alkali metal into a body of molten cathode metal which is normally solid, conveying the alloy so formed to a second vessel, and there treating said alloy to remove a portion at least of its alkali metal content, said treatment including combining said metal with a radical containing nitrogen, and returning the residual metal while still molten to the vessel first mentioned.

43. The process of abstracting alkali metal from a salt of the same which comprises electrolyzing a molten body of said salt in a vessel, and electrolytically depositing the alkali metal into a body of molten cathode metal which is normally solid, conveying the alloy so formed to a second vessel, and there treating said alloy to remove a portion at least of its alkali metal content, said treatment including combining said metal with an oxygen-free radical containing nitrogen.

44. The process of abstracting alkali metal from a salt of the same which comprises electrolyzing a molten body of said salt in a vessel and electrolytically depositing the alkali metal into a body of molten cathode metal which is normally solid, conveying the alloy so formed to a second vessel, and there treating said alloy to remove a portion at least of its alkali metal content, said treatment including combining said metal with an oxygen-free radical containing nitrogen, and returning the residual metal while still molten to the vessel first mentioned.

In witness whereof I subscribe my signature, in the presence of two witnesses.

CHARLES E. ACKER.

Witnesses:

CHAS. P. HIDDEN,

WM. M. STOCKBRIDGE.